July 2, 1940.  T. F. DWYER, JR  2,206,690
CUSHION WEAR PLATE
Filed Aug. 20, 1938  2 Sheets-Sheet 1

WITNESSES
A. B. Wallace
V. A. Peckham

INVENTOR.
Thomas F. Dwyer, Jr.
BY Brown, Critchlow & Flick
his ATTORNEYS.

July 2, 1940.  T. F. DWYER, JR  2,206,690
CUSHION WEAR PLATE
Filed Aug. 20, 1938    2 Sheets-Sheet 2
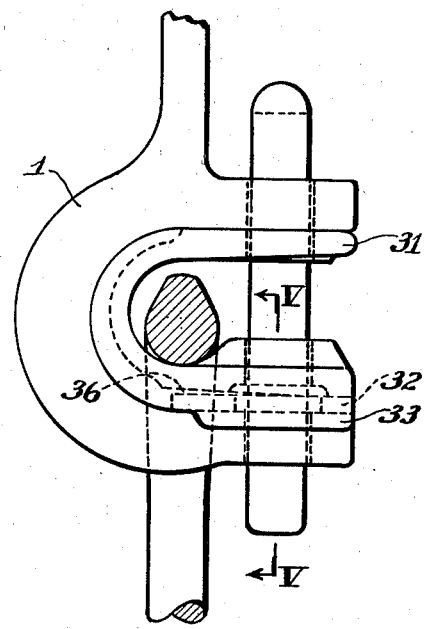
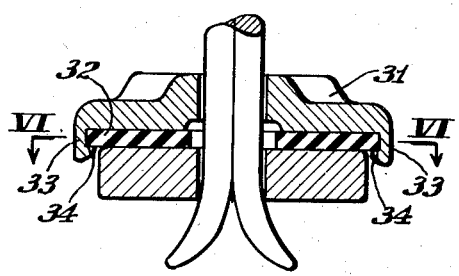
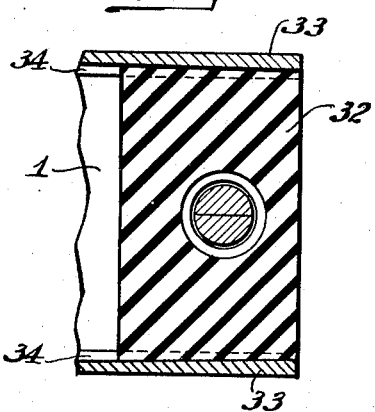
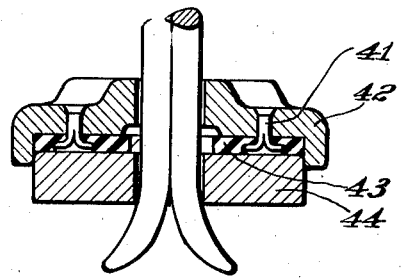
WITNESSES
A B Wallace
V. A. Peckham
INVENTOR.
Thomas F. Dwyer, Jr.
BY Brown, Critchlow & Flick
his ATTORNEYS.

Patented July 2, 1940

2,206,690

UNITED STATES PATENT OFFICE 2,206,690

CUSHIONED WEAR PLATE

Thomas F. Dwyer, Jr., Cambridge, Mass., assignor to Frederic Schaefer, Pittsburgh, Pa.

Application August 20, 1938, Serial No. 225,932

8 Claims. (Cl. 188—214)

This invention relates to the suspension of railway brake hangers from truck side frames, and more particularly to the association of hanger brackets and wear-plates used for that purpose.

In railroad car construction the greatest item of maintenance results from impact and vibration of movable component parts. One of the most affected areas is the brake rigging in which wear is caused by the constant vibration of the car trucks and may result in failure of parts, which is very serious. Most of the brake rigging vibration and shock is transmitted to it through the hanger brackets and wear-plates which support the brake hangers and attached beams.

It is among the objects of this invention to provide a hanger bracket and wear-plate assembly in which the relative movements between the bracket and wear-plate are cushioned whereby the vibrations of the bracket are not transmitted to the wear-plate and hanger.

In accordance with this invention a hanger wear-plate is separated from its supporting bracket by an intervening cushioning member secured to the wear-plate. The cushioning member is preferably in the form of a pad designed to absorb vibrations and damp them without transmitting them. The cushioning member may be attached to the wear-plate in any suitable manner, but in one form of the invention it is so related to the wear-plate that only part of it acts as a cushion under normal strains. It may be formed of various shock-absorbing materials; however, it is preferred to use a material having just enough resiliency to prevent transmission of undesirable vibrations without sufficient action to start amplification or sympathetic vibrations.

Figure 1:
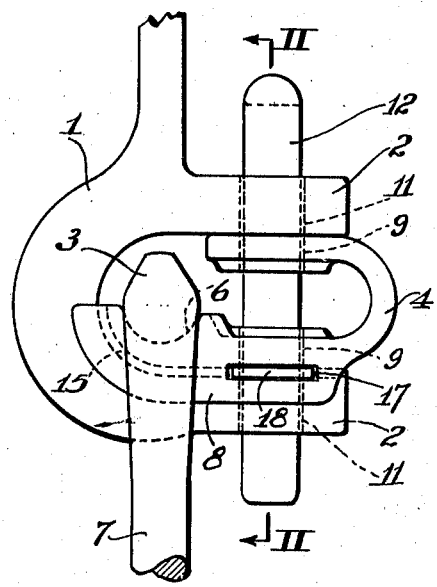
Figure 2:
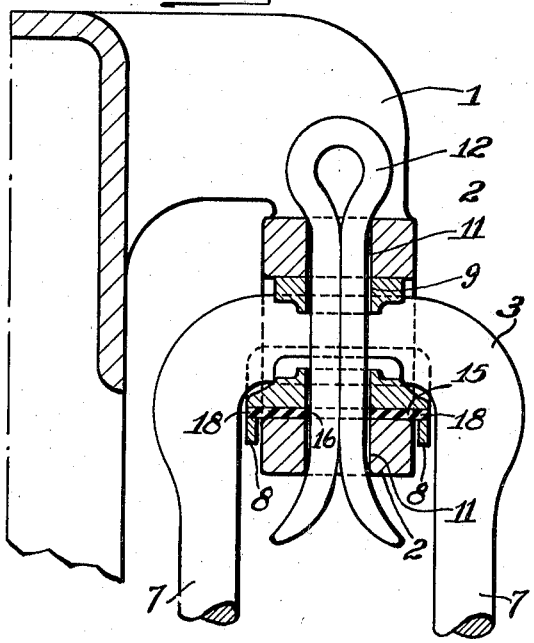
Figure 3:
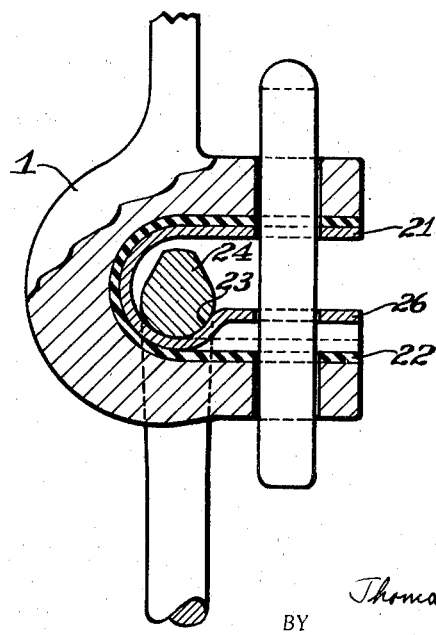

The invention is illustrated in the accompanying drawings in which Fig. 1 is a side view of a hanger bracket and wear-plate supporting a brake hanger; Fig. 2 is a vertical section taken on the line II—II of Fig. 1; Fig. 3 is a view similar to Fig. 1, but partly broken away, of a modification of this invention; Fig. 4 is a view similar to Fig. 1 of a further embodiment of the invention; Fig. 5 is a fragmentary vertical section taken on the line V—V of Fig. 4; Fig. 6 is a horizontal section taken on the line VI—VI of Fig. 5; and Fig. 7 is a view similar to Fig. 5 of a further modification.

Referring to Figs. 1 and 2 of the drawings, a bracket 1 is attached at its upper end to the side frame of a railway car truck. The lower portion of the bracket has laterally projecting spaced upper and lower walls 2 forming a jaw for receiving the upper yoke 3 of a brake hanger. To prevent the hanger yoke from wearing the lower wall of the bracket, a wear-plate 4 is detachably mounted in the jaw with its inner end provided with a concave hanger seat 6. To aid in centering the shoe in the bracket and to prevent the side arms 7 of the hanger from wearing the sides of the bracket, the wear-plate is preferably provided at its sides with downturned flanges 8. The outer portion of the wear-plate is U-shaped to form upper and lower legs that engage the upper and lower walls 2 of the bracket. These legs are provided with vertically aligned holes 9 in line with similar holes 11 in the bracket for receiving a cotter pin 12 or other fastening member that holds the wear-plate in the bracket.

It is a feature of this invention that the wear-plate is so mounted in the hanger bracket that the constant vibrations of the truck are largely absorbed or damped out before they reach the brake rigging. Accordingly, a cushioning pad 15 is disposed between the bottom of the wear-plate and the lower wall of the bracket, whereby the wear-plate is seated on a shock-absorbing member. This pad is likewise provided with an opening 16 for receiving the cotter pin 12, but in order that the wear-plate and pad may be handled as a unit when not mounted on the hanger bracket, they are secured together in any suitable manner. A convenient way of connecting them is by a tongue and slot connection; that is, wear-plate flanges 8 are provided with slots 17, and the sides of pad 15 with integral tongues 18 that project into the slots. The plate and pad are assembled by bowing the pad longitudinally sufficiently to draw the outer edges of the tongues into the space between flanges 8, aligning the tongues with slots 17, and then releasing the pad which will flatten out and project the tongues into the slots.

The material from which the cushioning pad is made can be any resilient material suitable for shock-absorbing purposes. However, it is preferred to use a material having high resistance to lateral flow so that it will not squeeze out between the wear-plate and bracket. Of course, it should have enough resiliency to damp vibrations by absorption, but should not be so resilient as to amplify them and start sympathetic vibrations. A pad having these characteristics is a laminated material formed from a plurality of layers of very thin tough cotton duck or canvas between at least some of which thin layers of soft rubber compound are disposed. The various layers are cemented together into a unitary pad. The rubber layers are too thin to have any substantial lateral yield, but thick enough to prevent the layers of fabric from becoming dead.

In the modification shown in Fig. 3 the wear-plate 21 is spaced throughout its area from the hanger bracket 1 by means of a shock-absorbing pad 22. The wear-plate is of the same general contour as the bracket jaw and is open at its outer end instead of its inner end like the plate shown in Fig. 1. To form the seat 23 for the yoke 24 of the brake hanger, the central portion of the lower leg of the wear-plate is offset upwardly as indicated at 26. The cushioning pad 22 is likewise U-shaped and extends from end to end of the wear-plate between it and the wall of the bracket jaw. The wear-plate is thus spaced throughout its length from the bracket so that there is no metal-to-metal contact between them. To permit the pad and wear-plate to be handled as a unit before installation, the pad is cemented or mechanically fastened in any suitable manner to the plate.

The embodiment of the invention shown in Figs. 4 to 6 utilizes a U-shaped wear-plate 31 similar to the one shown in Fig. 3, but only the lower leg of the plate is separated from the hanger bracket 1 by a cushioning pad 32. The bottom of the wear-plate is spaced from the lower wall of the bracket, and has depending side flanges 33 that overlap the bracket. The shock-absorbing pad is disposed in the space between the bottom of the wear-plate and the bracket whereby the plate is mounted on the pad by which it is separated from the bracket. To connect the pad to the wear-plate, flanges 33 are provided with interior longitudinal grooves 34 that receive the edges of the pad. These grooves preferably converge toward the outer end of the wear-plate, as shown in Fig. 6, so that the pad can be wedged therein.

Another feature of this embodiment of the invention is that the bottom of the wear-plate is inclined away from the lower wall of the bracket jaw as it approaches the inner end of the jaw. The result is that a space 36 (Fig. 4) normally exists between the bottom of the wear-plate and the inner end portion of the cushioning pad. Consequently, under the normal weight of light loads the wear-plate bears on only a portion of the pad, but as the loads increase with application of the brakes and that portion of the pad is compressed, the wear-plate engages the remainder of the pad. The area of engagement between the wear-plate and pad is therefore proportional to the load on the brake hanger.

The modification shown in Fig. 7 illustrates another way of fastening the pad to the wear-plate. This is done by means of rivets 41 extending through the plate 42 and pad 43 and countersunk therein. The lower ends of the rivets are normally spaced from the lower bracket wall 44 so that it will not interfere with the cushioning action of the pad.

With any of these embodiments of the invention vibration of the brake rigging and the wear of its component parts are materially reduced because the vibrations and shocks that would otherwise be transmitted to the brake rigging through the hanger bracket and wear-plate from the car truck are absorbed to a large extent by the cushioning pad before they can reach the wear-plate.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. In railway brake rigging, a brake hanger, a support therefor, a wear-plate disposed between said hanger and support, and shock-absorbing means disposed between said wear-plate and support, said means and wear-plate being provided with interengaging portions for locking them together.

2. In railway brake rigging, a brake hanger, a bracket for receiving and supporting the hanger and having top and bottom walls, a wear-plate mounted on said bottom wall and supporting the hanger, the wear-plate having depending side flanges provided with longitudinal inner grooves, and a cushioning member spacing said plate from said bottom wall, the edge portions of said member being disposed in said grooves for holding the member and plate together.

3. In railway brake rigging, a brake hanger, a bracket for receiving and supporting the hanger and having top and bottom walls, a wear-plate mounted on said bottom walls and supporting the hanger, the wear-plate having depending side flanges provided with openings therethrough, and a cushioning member spacing said plate from said bottom wall, the sides of said member being provided with extensions projecting into said openings for holding the member and plate together.

4. In railway brake rigging, a brake hanger, a bracket for receiving and supporting the hanger and having top and bottom walls, a wear-plate mounted on said bottom wall and supporting the hanger, the wear-plate having depending side flanges provided with longitudinal inner grooves, and a cushioning member spacing said plate from said bottom wall, the edge portions of said member being disposed in said grooves for holding the member and plate together, said grooves and cushioning member being tapered toward the outer end of said bottom wall.

5. In railway brake rigging, a brake hanger, a bracket for receiving and supporting the hanger and having top and bottom walls, a substantially U-shaped wear-plate mounted in said bracket between said top and bottom walls, said plate being provided with a seat for the hanger, and a cushioning member mounted between the wear-plate and said bottom wall, the lower surface of the wear plate beneath said seat normally being spaced from said member.

6. In railway brake rigging, a brake hanger, a support therefor, a wear-plate disposed between said hanger and support, and a shock-absorbing pad disposed between said wear-plate and support, said pad having sufficient resiliency to absorb vibrations of said support but insufficient resiliency to amplify the vibrations, a portion of said pad being normally spaced from the bottom of the wear-plate, and the area of said portion in contact with the wear-plate increasing with increased load on the hanger due to applying the brakes.

7. In railway brake rigging, a brake hanger, a supporting member for receiving and supporting the hanger, a metal wear member disposed in said supporting member and provided with a seat for the hanger, and cushioning means disposed between said wear member and the bottom of the supporting member, a portion of said cushioning means being spaced from one of said members when the hanger is loaded lightly, the area of said portion in contact with said one member increasing as the load on the hanger increases.

8. In railway brake rigging, a brake hanger, a bracket for receiving and supporting the hanger and having top and bottom walls, a substantially U-shaped wear-plate mounted in said bracket between said top and bottom walls, said plate being provided with a seat for the hanger, and a cushioning member mounted between the wear-plate and said bottom wall, the lower surface of the wear-plate being inclined upwardly from its outer end whereby the portion of said lower surface beneath said seat is normally spaced from the top of said cushioning member.

THOMAS F. DWYER, Jr.